United States Patent
An et al.

(10) Patent No.: US 11,761,981 B2
(45) Date of Patent: Sep. 19, 2023

(54) METHOD AND APPARATUS FOR IDENTIFYING SAMPLE POSITION IN ATOMIC FORCE MICROSCOPE

(71) Applicant: PARK SYSTEMS CORP., Suwon-si (KR)

(72) Inventors: JeongHun An, Suwon-si (KR); YongSung Cho, Suwon-si (KR); Sang-il Park, Suwon-si (KR)

(73) Assignee: PARK SYSTEMS CORP., Suwon-si (KR)

( * ) Notice: Subject to any disclaimer, the term of this patent is extended or adjusted under 35 U.S.C. 154(b) by 33 days.

(21) Appl. No.: 17/561,920

(22) Filed: Dec. 24, 2021

(65) Prior Publication Data

US 2022/0206039 A1  Jun. 30, 2022

(30) Foreign Application Priority Data

Dec. 31, 2020  (KR) .................. 10-2020-0189823

(51) Int. Cl.
*G01Q 30/02* (2010.01)
*G05B 13/02* (2006.01)
*G01Q 30/20* (2010.01)
*G01Q 60/24* (2010.01)

(52) U.S. Cl.
CPC ............. *G01Q 30/02* (2013.01); *G01Q 30/20* (2013.01); *G01Q 60/24* (2013.01); *G05B 13/027* (2013.01)

(58) Field of Classification Search
CPC ........ G01Q 30/02; G01Q 30/20; G01Q 60/24; G05B 13/027
USPC ...................................... 850/9, 33
See application file for complete search history.

(56) References Cited

U.S. PATENT DOCUMENTS

| | | | |
|---|---|---|---|
| 8,595,859 B1 | 11/2013 | Rankl et al. | |
| 9,564,291 B1 * | 2/2017 | Own | ............ C23C 14/24 |
| 2009/0077697 A1 | 3/2009 | Su et al. | |
| 2020/0005069 A1 | 1/2020 | Wang et al. | |
| 2020/0320697 A1 | 10/2020 | Wang et al. | |

(Continued)

FOREIGN PATENT DOCUMENTS

| | | |
|---|---|---|
| JP | H02-141601 A | 5/1990 |
| JP | H05-231863 A | 9/1993 |
| JP | H05-347338 A | 12/1993 |

(Continued)

OTHER PUBLICATIONS

A Japanese Office Action dated Apr. 4, 2023 in connection with Japanese Patent Application No. 2021-206218 which corresponds to the above-referenced U.S. application (English translation attached).

*Primary Examiner* — Nicole M Ippolito
(74) *Attorney, Agent, or Firm* — INVENSTONE Patent, LLC

(57) ABSTRACT

An apparatus and a method for identifying a sample position in an atomic force microscope according to an exemplary embodiment of the present disclosure are provided. The method for identifying a sample position in an atomic force microscope includes receiving a vision image including a subject sample through a vision unit; determining a subject sample region in the vision image using a prediction model which is configured to output the subject sample region by receiving the vision image as an input; and determining a position of the subject sample based on the subject sample region.

16 Claims, 15 Drawing Sheets

RECEIVING VISION IMAGE INCLUDING SUBJECT SAMPLE THROUGH VISION UNIT — S310

DETERMINING SUBJECT SAMPLE REGION IN VISION IMAGE USING PREDICTION MODEL — S320

DETERMINING POSITION OF SUBJECT SAMPLE — S330

(56) References Cited

U.S. PATENT DOCUMENTS

2020/0356718 A1   11/2020   Chu et al.

FOREIGN PATENT DOCUMENTS

| | | |
|---|---|---|
| JP | 2001-148016 A | 5/2001 |
| JP | 2004-205366 A | 7/2004 |
| JP | 2005-043108 A | 2/2005 |
| JP | 2014-183130 A | 9/2014 |
| JP | 2019-527375 A | 9/2019 |
| JP | 2020-181582 A | 11/2020 |

* cited by examiner (a)

(b)

(c)

(a)

(b)

(c)

(d)

(a)

(b)

METHOD AND APPARATUS FOR IDENTIFYING SAMPLE POSITION IN ATOMIC FORCE MICROSCOPE

CROSS-REFERENCE TO RELATED APPLICATIONS

This application claims the priority benefit of Korean Patent Application No. 10-2020-0189823 filed on Dec. 31, 2020, with the Korean Intellectual Property Office, the disclosure of which is incorporated herein by reference.

BACKGROUND

Field

The present disclosure relates to an apparatus and a method for identifying a sample position in an atomic force microscope.

Description of the Related Art

In general, a scanning probe microscope (SPM) refers to an apparatus for measuring a physical quantity that interacts between a sample and a probe tip when the probe tip is adjacent to a surface of the sample by scanning the surface of the sample which is a subject sample through a probe including a cantilever and the probe tip attached to the cantilever.

Such a scanning probe microscope may include a scanning tunneling microscope (STM) and an atomic force microscope (AFM) (hereinafter, referred to as 'atomic force microscope').

Here, in the atomic force microscope, laser light of an optical unit provided in the atomic force microscope is irradiated to a position corresponding to the probe tip of the cantilever, and accordingly the probe tip scans the surface of the sample as the cantilever is bent, so that a sample image obtained by imaging a shape (or curvature) of the sample surface may be obtained.

To drive the atomic force microscope as described above, a user may set a measurement position of the sample as one of various setting values for driving the atomic force microscope using a manual. In this case, even if the sample is changed, since the same feature is repeatedly measured in many cases, it is necessary to automatically identify the measurement position.

Therefore, there is a need for a method and an apparatus for accurately identifying a sample position in an atomic force microscope.

The background art has been prepared to facilitate understanding the present disclosure. It is not to be construed as an admission that matters described in the background art of the disclosure exist as prior arts.

SUMMARY

The inventors of the present disclosure have recognized the fact that usability of an atomic force microscope (AFM) is degraded by manually checking a measurement position by a user and moving a tip.

In particular, the inventors of the present disclosure were able to recognize that performing calibration by automatically identifying a position of a sample in a calibration step of the atomic force microscope helps to increase usability.

As a way to solve this problem, the inventors of the present disclosure have invented a machine-learned model with position of a sample, furthermore a method and an apparatus capable of accurately identifying the position of the sample using an identification factor.

Accordingly, an object of the present disclosure is to provide a method and an apparatus for identifying a sample position in an atomic force microscope.

It will be appreciated by persons skilled in the art that objects of the present disclosure are not limited to those described above and other objects that are not described above will be more clearly understood from the following descriptions.

A method and an apparatus for identifying a sample position in an atomic force microscope are provided in order to solve the objects as described above.

A method for identifying a sample position in an atomic force microscope according to an exemplary embodiment of the present disclosure includes: receiving a vision image including a subject sample through a vision unit; determining a subject sample region in the vision image using a prediction model which is configured to output the subject sample region by receiving the vision image as an input; and determining a position of the subject sample based on the subject sample region.

A method for identifying a sample position in an atomic force microscope according to another exemplary embodiment of the present disclosure includes: disposing an identification factor in an imaging angle of a vision unit; disposing a subject sample in a region which is spaced apart from the identification factor; identifying the identification factor through the vision unit; and determining a position of the subject sample based on the identification factor.

An apparatus for identifying a sample position in an atomic force microscope according to still another exemplary embodiment of the present disclosure includes a vision unit which is configured to obtain a vision image including a subject sample through the vision unit, and a controller which is operatively connected to the vision unit. The controller is configured to determine a subject sample region in the vision image using a prediction model which is configured to output the subject sample region by receiving the vision image as an input, and determine a position of the subject sample based on the subject sample region.

Details of other embodiments are included in the detailed description and drawings.

According to the present disclosure, the atomic force microscope can automatically identify and set the sample position without the need for the user to separately set the position of the sample in order to drive the atomic force microscope.

In addition, according to the present disclosure, by using an artificial neural network model to identify a sample position, a computational speed for identifying the sample position can be increased to improve identification performance of the atomic force microscope.

More specifically, even if properties such as degrees of contrast, illuminance, and saturation of the vision image change or a part of a pattern of the sample changes, the sample position can be determined with high accuracy by the artificial neural network model based on pattern identification.

Furthermore, it can be possible to accurately i a position of a sample having a very small size.

That is, according to the provision of a method and an apparatus for identifying a position of a sample, even if a user does not know the position of the sample accurately, the position of the sample can be set by an artificial neural network model, so that the atomic force microscope can be easily driven.

In particular, the present disclosure can be applied to a calibration step of an atomic force microscope, where accurate positional setting a sample is important. Accordingly, the user can easily perform calibration for driving the atomic force microscope.

Effects according to the present disclosure are not limited by the contents exemplified above, and more various effects are included in the present specification.

DETAILED DESCRIPTION OF EXEMPLARY EMBODIMENTS

Figure 1A:
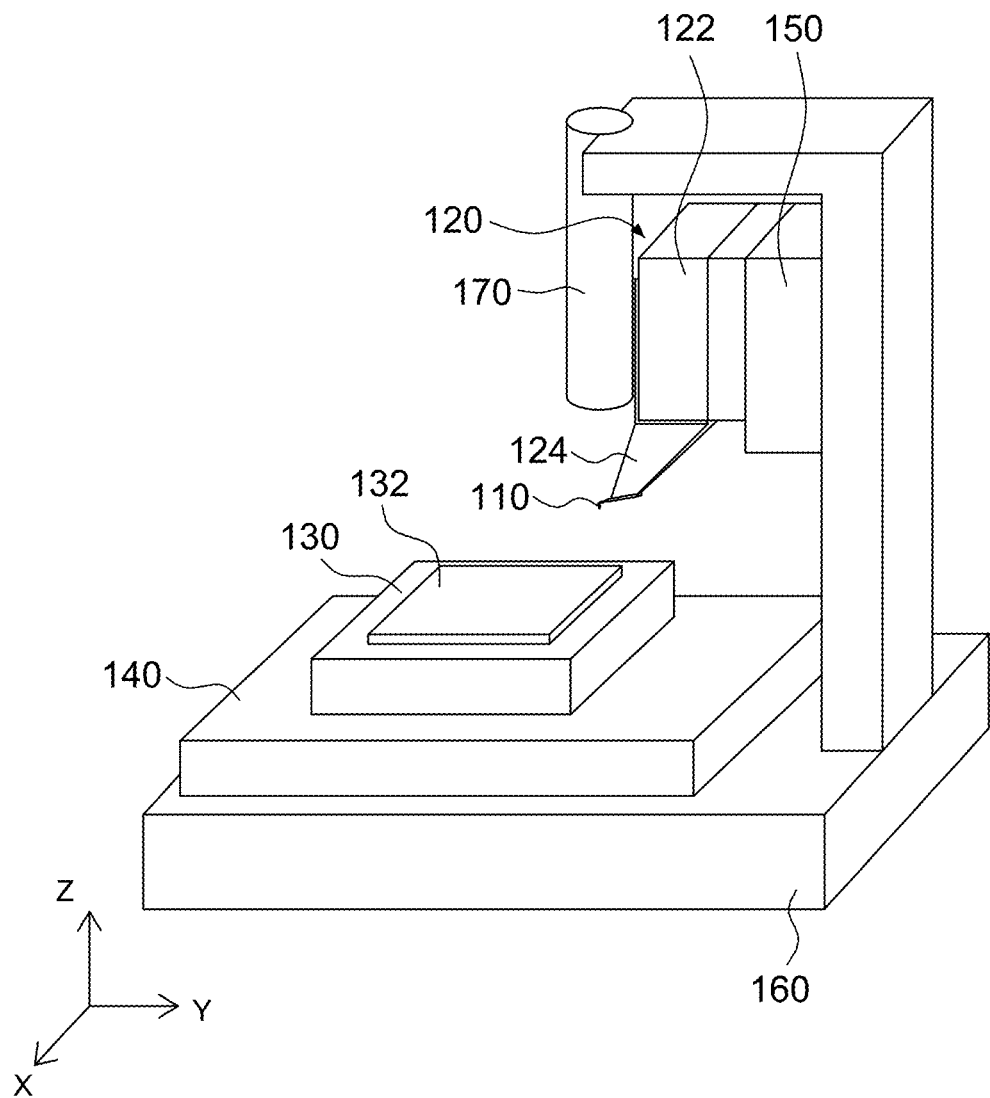
FIG. 1A, FIG. 1B, and FIG. 1C are schematic diagrams for explaining an atomic force microscope according to an exemplary embodiment of the present disclosure.

Advantages and features of the present disclosure and methods to achieve them will become apparent from descriptions of exemplary embodiments herein below with reference to the accompanying drawings. However, the present disclosure is not limited to the exemplary embodiments disclosed herein but may be implemented in various different forms. The exemplary embodiments are provided to make the description of the present disclosure thorough and to fully convey the scope of the present disclosure to those skilled in the art. It is to be noted that the scope of the present disclosure is defined only by the claims. In connection with the description of drawings, the same or like reference numerals may be used for the same or like elements.

In the disclosure, expressions "have," "may have," "include" and "comprise," or "may include" and "may comprise" used herein indicate presence of corresponding features (for example, elements such as numeric values, functions, operations, or components) and do not exclude the presence of additional features.

In the disclosure, expressions "A or B," "at least one of A or/and B," or "one or more of A or/and B," and the like used herein may include any and all combinations of one or more of the associated listed items. For example, the "A or B," "at least one of A and B," or "at least one of A or B" may refer to all of case (1) where at least one A is included, case (2) where at least one B is included, or case (3) where both of at least one A and at least one B are included.

The expressions, such as "first," "second," and the like used herein, may refer to various elements of various exemplary embodiments of the present disclosure, but do not limit the order and/or priority of the elements. Furthermore, such expressions may be used to distinguish one element from another element. For example, "a first user device" and "a second user device" indicate different user devices regardless of the order or priority. For example, without departing from the scope of the present disclosure, a first element may be referred to as a second element, and similarly, a second element may also be referred to as a first element.

It will be understood that when an element (for example, a first element) is referred to as being "(operatively or communicatively) coupled with/to" or "connected to" another element (for example, a second element), it can be understood as being directly coupled with/to or connected to another element or coupled with/to or connected to another element via an intervening element (for example, a third element). On the other hand, when an element (for example, a first element) is referred to as being "directly coupled with/to" or "directly connected to" another element (for example, a second element), it should be understood that there is no intervening element (for example, a third element).

According to the situation, the expression "configured to (or set to)" used herein may be replaced with, for example, the expression "suitable for," "having the capacity to," "designed to," "adapted to," "made to," or "capable of". The term "configured to (or set to)" must not mean only "specifically designed to" in hardware. Instead, the expression "a device configured to" may mean that the device is "capable of operating together with another device or other components. For example, a "processor configured to (or set to) perform A, B, and C" may mean a dedicated processor (for example, an embedded processor) for performing a corresponding operation or a generic-purpose processor (for example, a central processing unit (CPU) or an application processor) which may perform corresponding operations by executing one or more software programs which are stored in a memory device.

Terms used in the present disclosure are used to describe specified exemplary embodiments of the present disclosure and are not intended to limit the scope of other exemplary embodiments. The terms of a singular form may include plural forms unless otherwise specified. All the terms used herein, which include technical or scientific terms, may have the same meaning that is generally understood by a person skilled in the art. It will be further understood that terms which are defined in a dictionary among terms used in the disclosure, can be interpreted as having the same or similar meanings as those in the relevant related art and should not be interpreted in an idealized or overly formal way, unless expressly defined in the present disclosure. In some cases, even in the case of terms which are defined in the specification, they cannot be interpreted to exclude exemplary embodiments of the present disclosure.

Features of various exemplary embodiments of the present disclosure may be partially or fully combined or coupled. As will be clearly appreciated by those skilled in the art, technically various interactions and operations are possible, and respective exemplary embodiments may be implemented independently of each other or may be implemented together in an associated relationship.

In the present specification, an image may be a still image and/or a video, but is not limited thereto.

Hereinafter, various exemplary embodiments of the present disclosure will be described in detail with reference to the accompanying drawings.

Figure 1B:
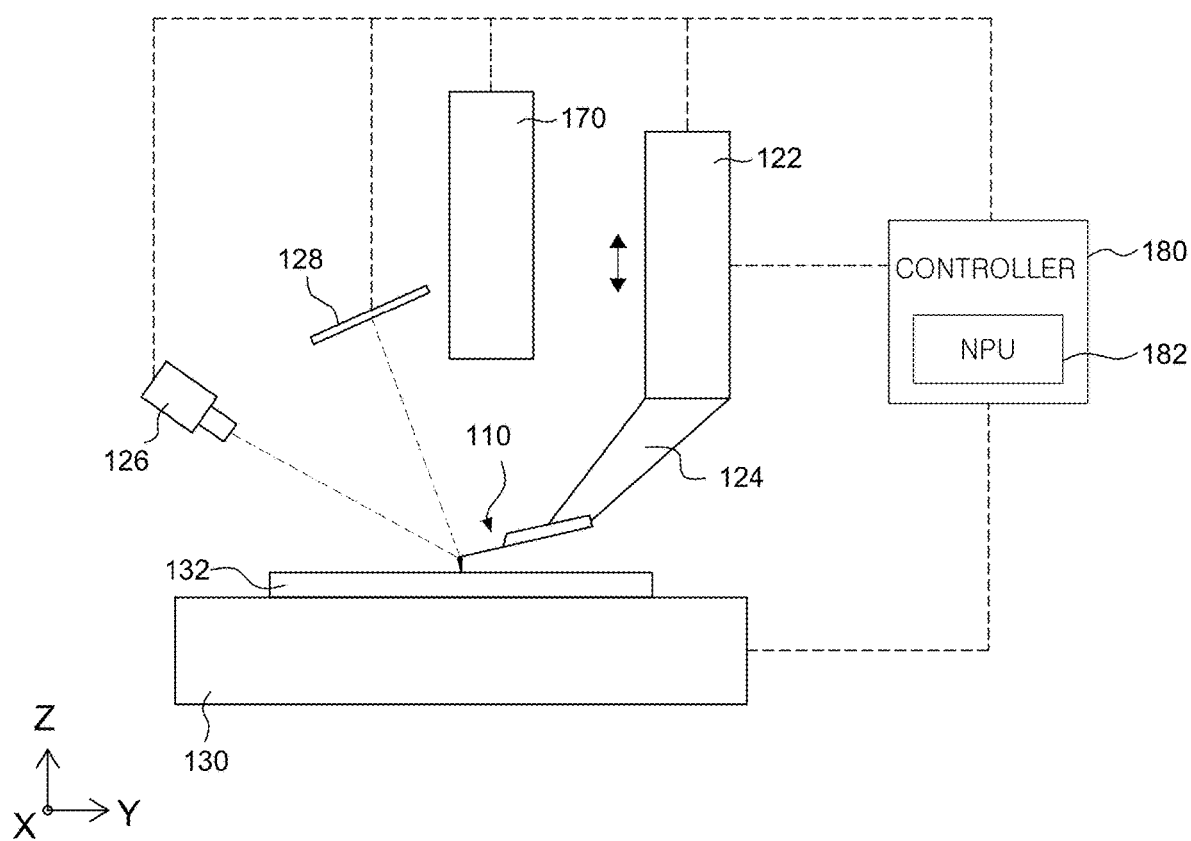
Figure 1C:
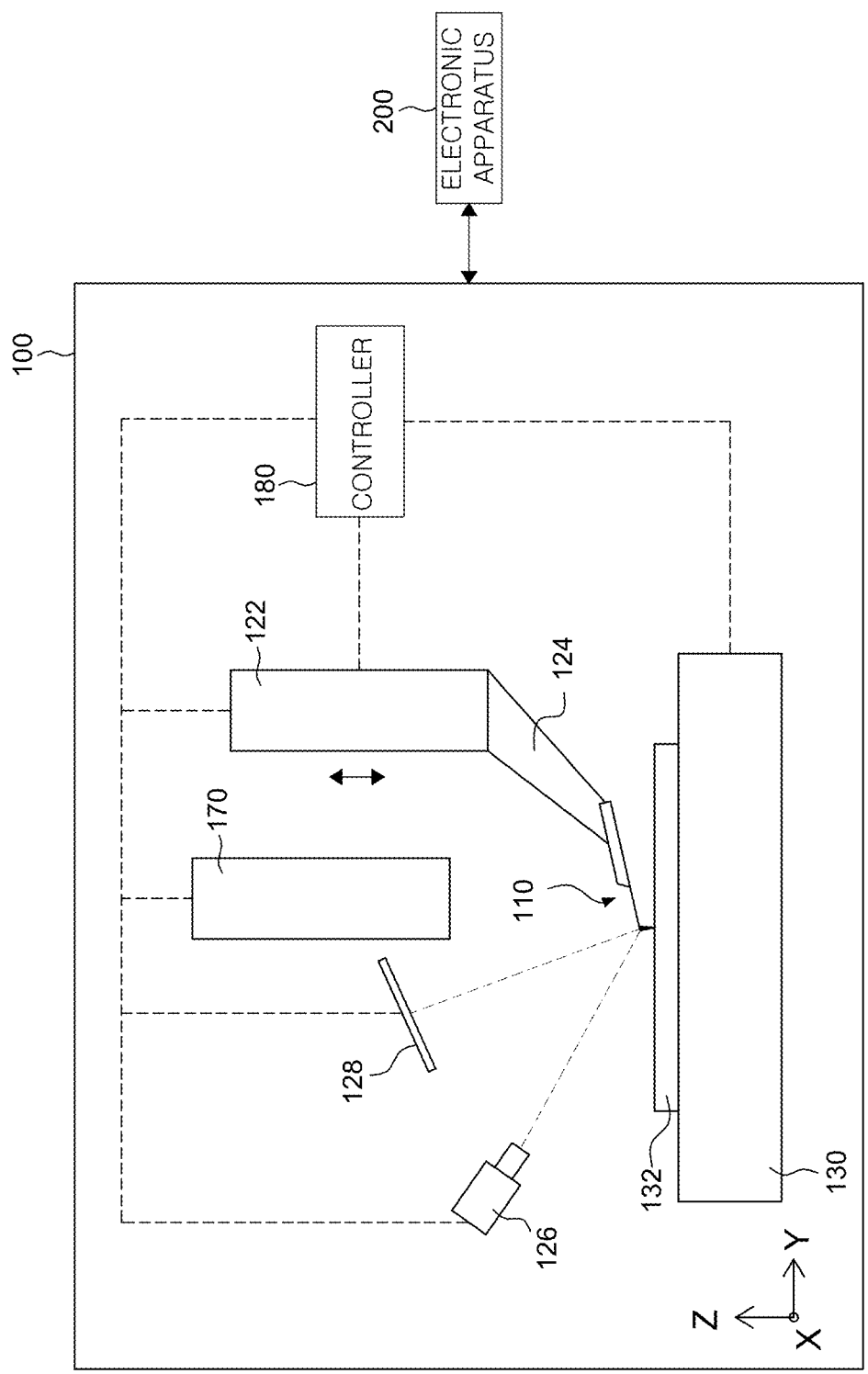

FIG. 1A, FIG. 1B, and FIG. 1C are schematic diagrams for explaining an atomic force microscope according to an exemplary embodiment of the present disclosure. In the presented embodiment, an atomic force microscope in which an X-Y scanner and a Z scanner are separated will be described.

Referring to FIGS. 1A and 1B, an atomic force microscope 100, which is a microscope device for analyzing and observing a surface area characteristic of a sample by imaging it in an atomic unit, includes a probe 110 which includes a tip and a cantilever, a head 120 which includes a Z scanner 122 and a probe arm 124, an optical unit 126 which irradiates laser light onto a cantilever surface of the probe 110, an optical detector 128 which detects a position of the laser light reflected from the cantilever surface, an X-Y scanner 130 on which a sample 132 is mounted and which moves the sample 132, an X-Y stage 140 which moves the sample 132 and the X-Y scanner 130, a Z stage 150 which moves the head 120, a fixed frame 160, a vision unit 170 which shows the probe 110 and/or a surface of the sample 132, and a controller 180 which controls them.

First, the probe 110 includes a tip and a cantilever, and the probe may be configured such that the tip follows a surface of the sample 132 in a contact or non-contact state. The probe 110 may be configured to include a variously shaped tip according to a manufacturer, a model, and/or a version, but is not limited thereto.

The Z scanner 122 included in the head 120 is connected to the probe 110 through the probe arm 124 and may also move the probe 110 in a Z-direction (e.g., in a vertical direction) by displacing the probe arm 124 in the Z-direction.

The Z scanner 122 may be driven, for example, by a piezoelectric actuator, but is not limited thereto, and may be driven by a stacked piezoelectric actuator when separated from the X-Y scanner 130. In various exemplary embodiments, a tube scanner (not shown) may be used to move a height of the probe 110.

The probe 110 is fixed to an end portion of the probe arm 124 included in the head 120.

The optical unit 126 irradiates laser light to a target position corresponding to the probe 110 on an upper surface of the cantilever. The cantilever is bent or warped by the laser light irradiated to the target position, and then the probe 110 scans a surface of a subject sample.

The laser light which is reflected from the cantilever is focused on the optical detector 128 such as a position sensitive position detector (PSPD). According to the bending or warpage of the cantilever, spot movements of the laser light focused on the optical detector 128 are detected, and through this, surface information of the sample which is disposed on the X-Y scanner 130 may be obtained.

The X-Y scanner 130 may move the sample 132 so that the probe 110 moves relative to the surface of the sample 132 in at least a first direction. Specifically, the X-Y scanner 130 may scan the sample 132 in an X-direction and a Y-direction in an X-Y plane.

The X-Y stage 140 may move the sample 132 and the X-Y scanner 130 in the X direction and Y direction with relatively large displacements. The X-Y stage 140 may be fixed to the fixed frame 160.

The Z stage 150 may move the head 120 in the Z-direction with a relatively large displacement.

The fixed frame 160 may fix the X-Y stage 140 and the Z stage 150 thereto.

The vision unit 170 may show the probe 110 or the sample 132. The vision unit 170 includes a barrel, an objective lens, a light supply unit, and a CCD camera, and an image which is magnified by the objective lens by receiving light from the light supply unit is converted to be visible by the CCD camera and may be displayed through a separate display device. It should be noted that a specific configuration of the vision unit 170 is a known configuration and thus, illustration thereof is omitted.

In various exemplary embodiments, the vision unit 170 may be an on-axis camera capable of capturing a sample image of the surface of the sample 132, but is not limited thereto. For example, the vision unit 170 may be an off-axis camera capable of capturing an image of a lower magnification (or field of view) than the on-axis camera.

In various exemplary embodiments, the vision unit 170 may identify an identification factor which is previously disposed in an imaging angle, and may obtain a vision image for a subject sample which is previously disposed in a region which is spaced apart from the identification factor, based on the identification factor.

In this case, the identification factor may be at least one of a QR code, a barcode, an NFC tag, an RFID tag, and an OCR code, but is not limited thereto, and may be a mark such as a character or a figure.

In various exemplary embodiments, the vision unit 170 may be moved along the Z axis, and through this, may show the surface of the sample 132 by magnifying it. In this case, a focus of the vision unit 170 may be changed along the Z axis.

In various exemplary embodiments, the vision unit 170 may be fixed to the fixed frame 160, but is not limited thereto, and may be fixed to another member.

The controller 180 may be connected to the head 120, the optical unit 126, the optical detector 128, the X-Y scanner 130, the Z stage 150, and the vision unit 170 and control their driving. The controller 180 may be provided in the atomic force microscope or may be implemented as a separate device, but the present disclosure is not limited thereto, and the controller 180 may be implemented in various manners to control the components described above.

Specifically, the controller 180 may determine a degree of bending and/or warpage of the cantilever based on a signal obtained from the optical detector 128. Also, the controller 180 may transmit a driving signal for the X-Y scanner 130 to scan the sample 132 in an X-Y direction to the X-Y scanner 130. The controller 180 may control the Z scanner 122 so that the cantilever maintains a predetermined degree of bending or the cantilever vibrates with a constant amplitude. The controller 180 may measure a length of the Z scanner 122 or measure a voltage applied to an actuator used in the Z scanner 122, thereby obtaining subject sample data (e.g., topography) that shapes the surface of the subject sample.

Meanwhile, to drive the atomic force microscope 110, a user needs to input a measurement position of the sample as one of various setting values for driving the atomic force microscope 110. The measurement position of such a sample needs to be accurately set in measuring the sample by driving the atomic force microscope or a calibration step before the driving.

To accurately identify a position of the subject sample on the surface of the sample 132, the controller 180 may obtain a vision image for the subject sample through the vision unit 170, and determine a region of the subject sample based on the obtained vision image. More specifically, the controller 180 may be configured to determine a subject sample region in the vision image using a prediction model which is configured to output the subject sample region by receiving the vision image as an input, and determine the position of the subject sample based on the subject sample region.

In an exemplary embodiment, the controller 180 may determine a position of a subject sample defined as a subject having a pattern which is a set of figures or characters on a substrate using a trained prediction model to learn the pattern and output a region of the subject sample.

In this case, the controller 180 may extract a feature of the pattern using the prediction model, and determine the region of the subject sample based on the feature.

More specifically, the controller 180 may identify the position of the sample using a prediction model trained to identify the subject sample based on a plurality of reference images (or training images) of the sample 132 captured in various environments. Here, the plurality of reference images may be images obtained by capturing the subject sample while constantly changing the intensity of illumination around the subject sample and/or a focal length of the vision unit 170 (that is, a focal length of a camera and/or an objective lens).

In this case, the subject sample is a subject having a pattern that is a set of figures or characters on a substrate, and may be a sample having a pattern which is predetermined for a sample frequently used by a user or calibration. However, a type of the subject sample is not limited thereto.

Meanwhile, the prediction model may be an artificial neural network model which is configured to learn the plurality of reference images in advance and identify the subject sample region from the vision image which is newly input. In various exemplary embodiments, the prediction model may be a pre-trained convolutional neural network (CNN), but is not limited thereto. The pre-trained convolutional neural network may be composed of one or more layers that perform a convolution computation on an input value, and may infer an output value by performing a convolution computation from the input value. For example, the pre-trained convolutional neural network may be Mask R-CNN (regions with convolutional neural network) that perform a classification operation, a bounding box regression operation for setting (or adjusting) a bounding box including a boundary of an object (that is, the subject sample), and a binary masking operation for segmenting an object and a background other than the object at the same time in a plurality of artificial neural network stages, but is not limited thereto, and the pre-trained convolutional neural network may be based on various region segmentation algorithms capable of segmenting the subject sample region in the vision image. For example, the prediction model may be an artificial neural network model based on RetinaNet or an artificial neural network model based on Faster R-CNN.

In such a prediction model, one stage may perform the classification operation and the regression operation to output classification data and bounding box data indicating a classification result, and another stage may perform the binary masking operation to output segmentation data.

In various exemplary embodiments, the controller 180 may identify a calibration sample region using the prediction model, determine a calibration sample position based on this, and calibrate the atomic force microscope 100 when the sample position is determined.

That is, when a calibration sample is disposed by a user, a sample region is identified by the controller 180, a position of the sample is determined, and the position of the calibration sample is set. Then, calibration may be performed.

Meanwhile, the controller 180 may calculate center coordinates of the subject sample region determined by the prediction model, and based on this, determine the position of the subject sample.

In various exemplary embodiments, the controller 180 may determine the position of the subject sample based on the identification factor which is previously disposed in the imaging angle of the vision unit 170.

More specifically, when the identification factor is identified by the vision unit 170 and a vision image for the subject sample disposed near the identification factor is obtained, the controller 180 may determine the position of the sample using the vision image.

Referring to FIG. 1C, the atomic force microscope 100 includes the probe 110, the head 120 including the Z scanner 122 and the probe arm 124, the optical unit 126, the optical detector 128, the X-Y scanner 130 on which the sample 132 is mounted, the X-Y stage 140, the Z stage 150, the fixed frame 160, and the vision unit 170, and an electronic apparatus 200 for controlling them may be separately provided.

The electronic apparatus 200 may include at least one of a tablet PC (personal computer), a notebook computer, and/or a PC for controlling the atomic force microscope 100 and identifying the position of the sample.

The electronic apparatus 200 may receive the vision image for the subject sample on the surface of the sample 132 which is obtained through the vision unit 170 from the atomic force microscope 100, determine the region of the sample based on the received vision image, and determine the position of the sample based on the determined subject sample region.

Through this, in the present disclosure, a user can drive the atomic force microscope without setting a sample position in the atomic force microscope by identifying the sample position.

Hereinafter, the electronic apparatus 200 will be described in more detail with reference to FIG. 2.

Figure 2:
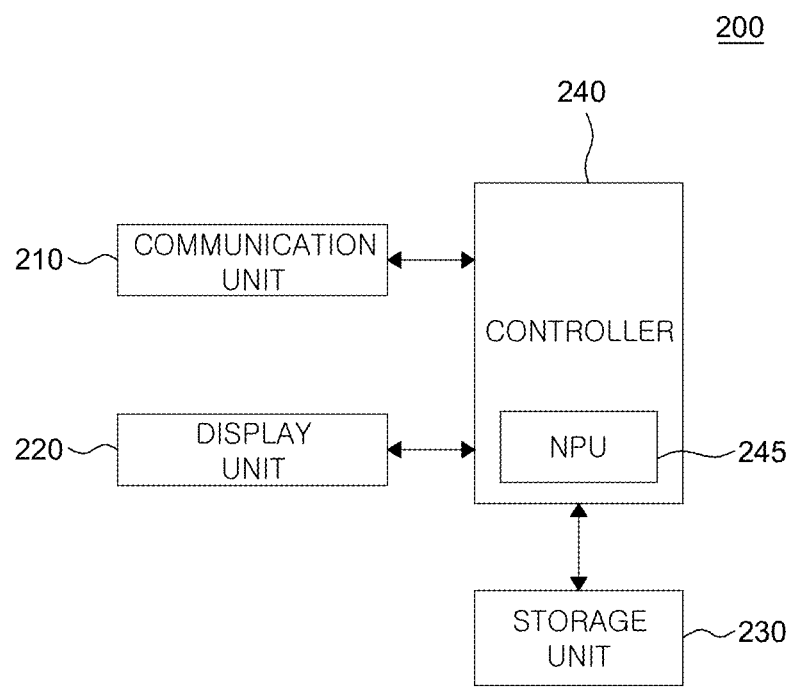
FIG. 2 is a schematic block diagram of an electronic apparatus according to an exemplary embodiment of the present disclosure.

FIG. 2 is a schematic block diagram of an electronic apparatus according to an exemplary embodiment of the present disclosure.

Referring to FIG. 2, the electronic apparatus 200 includes a communication unit 210, a display unit 220, a storage unit 230, and a controller 240.

The communication unit 210 connects the electronic apparatus 200 to an external device so that they can be in communication with each other. The communication unit 210 may be connected to the atomic force microscope 100 using wired/wireless communication to transmit/receive various data related to driving and control of the atomic force microscope 100. Specifically, the communication unit 210 may transmit instructions for driving and controlling each component of the atomic force microscope 100, or may receive a vision image obtained through the vision unit 170.

The display unit 220 may display various contents (e.g., texts, images, videos, icons, banners or symbols, etc.) to the user. Specifically, the display unit 220 may display subject sample data received from the atomic force microscope 100.

In various exemplary embodiments, the display unit 220 may include a touch screen, and may receive, for example, a touch, gesture, proximity, drag, swipe, or hovering input using an electronic pen or a part of the user's body.

The storage unit 230 may store various data used to drive and control the atomic force microscope 100. In various exemplary embodiments, the storage unit 230 may include at least one type of storage medium among a flash memory type, a hard disk type, a multimedia card micro-type, a card type memory (e.g., an SD or XD memory, etc.), a random-access memory (RAM), a static random-access memory (SRAM), a read-only memory (ROM), an electrically erasable programmable read-only memory (EEPROM), a programmable read-only memory (PROM), a magnetic memory, a magnetic disk, and an optical disk. The electronic apparatus 200 may operate in relation to a web storage that performs a storage function of the storage unit 230 on the Internet.

The controller 240 is operatively connected to the communication unit 210, the display unit 220, and the storage unit 230, and may perform various commands for identifying the position of the sample.

The controller 240 may be configured to include at least one of a central processing unit (CPU), a graphic processing unit (GPU), an application processor (AP), a digital signal processing unit (DSP), an arithmetic logic unit (ALU), and an artificial neural network processor (NPU) 245.

Specifically, the controller 240 may receive the vision image for the sample 132 from the atomic force microscope 100 through the communication unit 210, determine the region of the subject sample based on the received vision image, and determine the position of the sample based on the determined region of the subject sample. A detailed operation for this may be the same as that of the controller 180 described with reference to FIGS. 1A and 1B.

In various exemplary embodiments, an artificial neural network model such as the prediction model for identifying the subject sample, particularly the prediction model for identifying the pattern of the subject sample, may be stored in an external server. In this case, the controller 240 may transmit the vision image to an external server through the communication unit 210 and receive result data calculated from the external server (i.e., result data of identifying the region of the sample).

In this manner, operations using the artificial neural network model may be performed by the NPU 245, and the NPU 245 may perform the same operations as an NPU 182 described with reference to FIG. 1B.

Hereinafter, a method for identifying the sample position using the vision image for the subject sample will be described in detail with reference to FIGS. 3 to 5.

Figure 3:
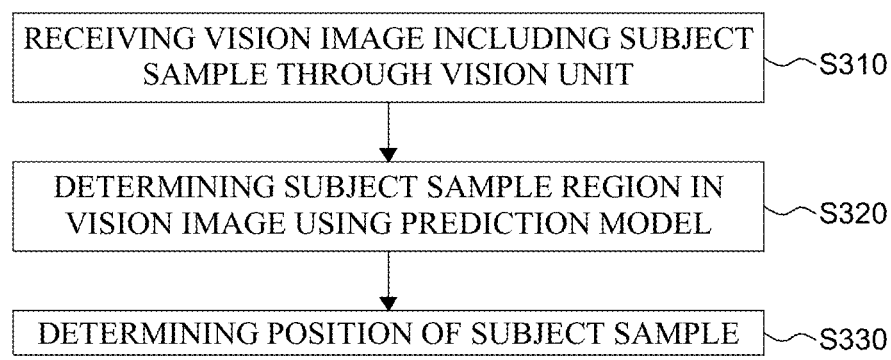
FIG. 3 is an exemplary diagram for explaining a method for identifying a position of a subject sample using a vision image of the sample according to an exemplary embodiment of the present disclosure.

FIG. 3 is an exemplary diagram for explaining a method for identifying a position of a subject sample using a vision image of the sample according to an exemplary embodiment of the present disclosure. FIGS. 4 and 5 are exemplary diagrams for respectively explaining determining a sample region using a prediction model used to identify a position of a sample according to an exemplary embodiment of the present disclosure. The operations to be described below may be performed by the controller 180 of FIG. 1B or the controller 240 of FIG. 2, described above.

First, referring to FIG. 3, to identify the sample position, the vision image including the subject sample is received through the vision unit in step S310, the subject sample region in the vision image is determined by the prediction model in step S320, and the position of the subject sample is determined based on the subject sample region in step S330.

According to an exemplary embodiment of the present disclosure, in the step S310 in which the vision image is received, the vision image for the subject sample which is an object having a pattern that is a set of figures or characters on a substrate may be obtained.

According to another exemplary embodiment of the present disclosure, in the step S310 in which the vision image is received, an on-axis camera image obtained from the vision unit of the on-axis camera may be received.

According to another exemplary embodiment of the present disclosure, in the step S310 in which the vision image is received, the received vision image may be an image for a calibration sample. In addition, the vision image may include an identification factor. That is, the vision unit may capture the vision image including the subject sample by identifying the identification factor.

In this case, the identification factor may include information on the subject sample, for example, features such as the name of the subject sample mapped in advance by a user, and further, a type of the probe, scan parameters, and the like.

Next, in the step S320 in which the subject sample region is determined, the sample region is determined by an artificial neural network-based prediction model which is configured to output the subject sample region by receiving the vision image as an input.

Figure 4:
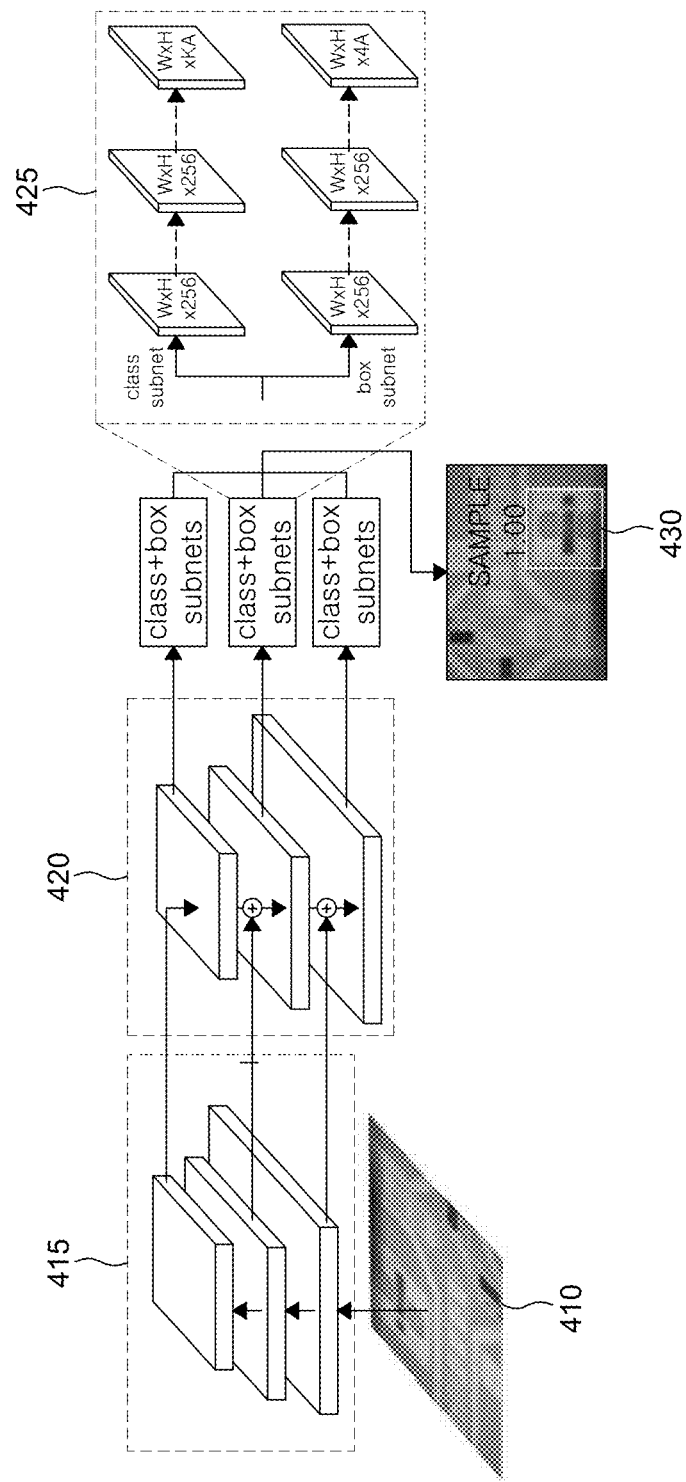
FIGS. 4 and 5 are exemplary diagrams for respectively explaining determining a sample region using a prediction model used to identify a position of a sample according to an exemplary embodiment of the present disclosure.

For example, referring to FIG. 4 together, in the step S320 in which the subject sample region is determined, the subject sample region in the vision image is determined by a prediction model 400 which is composed of a plurality of artificial neural networks based on RetinaNet. In this case, in the presented embodiment, the prediction model 400 may refer to the prediction model described above with reference to FIGS. 1A and 1B.

At this time, the prediction model 400 based on RetinaNet includes a ResNet 415 which performs deep feature extraction by receiving a vision image 410 and a backbone of a feature pyramid network (FPN) 420 which constitutes an abundant multi-scale feature pyramid for the vision image 410 of a single-resolution which is input. In this case, the ResNet 415 may be a Resnet50 composed of 50 layers, but is not limited thereto. Furthermore, two subnetworks 425 for respectively performing class classification and box regression are formed on the feature pyramid network 420.

More specifically, in the step S320 in which the subject sample region is determined, when the vision image 410 including the subject sample having the pattern is input to the ResNet 415, deep features are extracted based on the pattern. Then, the abundant multi-scale feature pyramid is built by horizontally connected networks of the feature pyramid network 420. Then, a class of an anchor box which is determined according to the region of the subject sample is classified by a class subnet of the subnetworks 425. At the same time, a distance between the anchor box and an object box corresponding to a region of an actual subject sample is predicted by a box subnet. Finally, a subject sample region 430 is determined. In this case, class classification probability, that is, the probability of being the subject sample for the determined subject sample region may be selectively output together.

Meanwhile, according to another feature of the present disclosure, in the step S320 in which the subject sample region is determined, a prediction model based on Mask R-CNN may be used.

Figure 5:
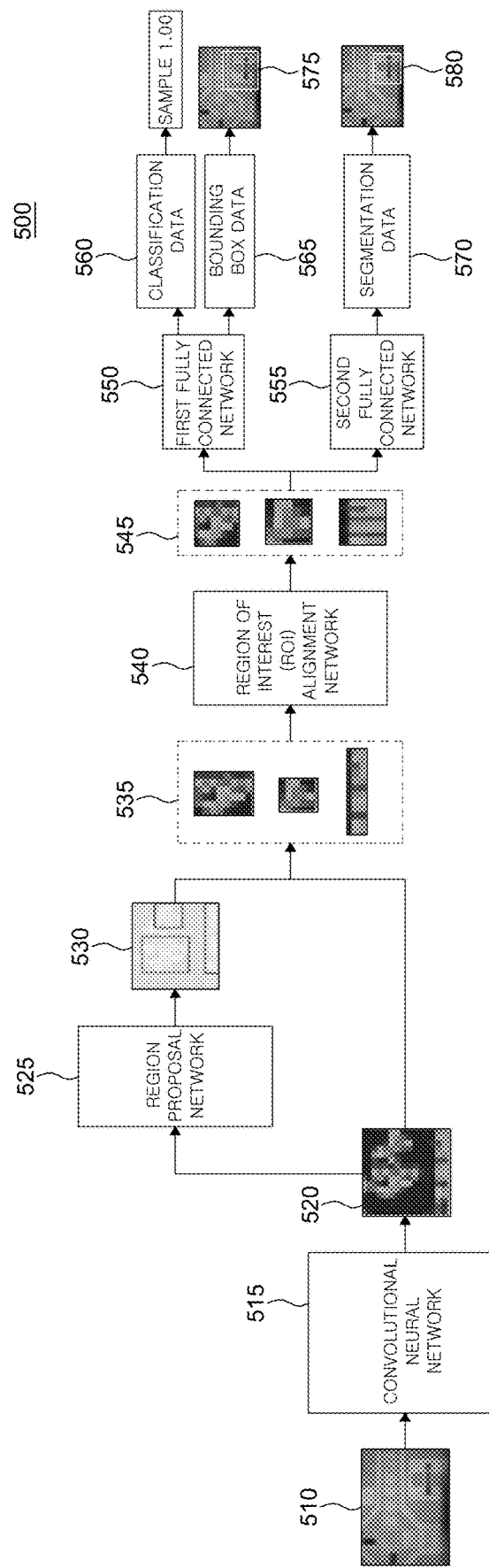

For example, referring to FIG. 5 together, in the step S320 in which the subject sample region is determined, the subject sample region in the vision image is determined by a prediction model 500 which is composed of a plurality of artificial neural networks based on Mask R-CNN. In this case, in the presented embodiment, the prediction model 500 may refer to the prediction model described with reference to FIGS. 1A and 1B.

In this case, the prediction model 500 based on Mask R-CNN may include a convolutional neural network 515, a region proposal network 525, a region of interest (ROI) alignment network 540, and a plurality of fully connected networks 550 and 555. Here, the plurality of fully connected networks includes a first fully connected network 550 and a second fully connected network 555.

More specifically, in the step S320 in which the subject sample region is determined, when a vision image 510 of the subject sample having the pattern formed therein, which is obtained through the vision unit is input as an input value of the prediction model 500, the prediction model 500 may obtain feature data (feature map) 520 through the convolutional neural network 515 that performs a convolution computation for extracting features from the vision image 510. In this case, the feature data 520 may have various values according to the pattern of the subject sample.

The feature data 520 is input to the region proposal network 525 for proposing a candidate region which is predicted to include the subject sample. The prediction model 500 may obtain data 530 including a candidate region (a region proposal) which is predicted to include the subject sample from the feature data 520 through the region proposal network 525 and an objectness score therefor.

Candidate region data 535 may be obtained based on the feature data 520 which is output through the convolutional neural network 515 and the data 530 which is output through the region proposal network 525. Here, the candidate region data 535 may be data extracted from the feature data 520 in response to at least one candidate region which is predicted to include a sample holder, particularly, a subject sample on the sample holder. The at least one candidate region may have various sizes according to a shape of the predicted object.

The candidate region data 535 is input to the ROI alignment network 540 for conversion to a fixed size using linear interpolation. Here, the fixed size may be in the form of n×n (n>0), but is not limited thereto.

The prediction model 500 may output ROI data 545 in the form of n×n through the ROI alignment network 540. In this case, the ROI data 545 may be data obtained by aligning the candidate region data 535 with a fixed size using linear interpolation, but is not limited thereto.

The ROI data 545 is input to each of the first fully connected network 550 and the second fully connected network 555. Here, the first fully connected network 550 may include a plurality of fully connected layers, but is not limited thereto. The second fully connected network 555 may be a mask branch network to which an auto-encoder structure is added or may be at least one fully connected layer (or convolutional layer), but is not limited thereto. The auto-encoder used herein is an encoder that has been trained to reconstruct and output an original input without noise after adding noise to input data, and may improve segmentation performance of the prediction model 500.

The prediction model 500 may output classification data 560 and bounding box data 565 through the first fully connected network 550, and output segmentation data 570 through the second fully connected network 555 as result data. For example, the classification data 560 may be result data indicating a class classification result (sample) for the subject sample region, the bounding box data 565 may be result data indicating a bounding box 575 formed around the subject sample region, and the segmentation data 570 may be result data indicating a subject sample region 580 and a background other than the subject sample region.

In various exemplary embodiments, to improve identification accuracy of the artificial neural network prediction model 500, a post processing method of clustering a periphery of the result data may be used. For example, as the clustering method, a conditional random field (CRF) and/or Chan-Vese algorithm may be used, but the present disclosure is not limited thereto.

The classification data 560 and the segmentation data 570 output as described above may be used to determine the subject sample region.

That is, referring to FIG. 4 together again, as a result of the step S320 in which the subject sample region is determined, the subject sample region may be obtained by a prediction model based on various region segmentation algorithms.

Meanwhile, in the step S320 in which the subject sample region is determined, the subject sample of which a region (or position) is determined by the prediction model may be set in various ways according to a type of training data of the prediction model. In a specific embodiment, the subject sample may be a sample having a pattern frequently used by a user, but is not limited thereto.

Next, in the step S330 in which the position of the subject sample is determined, an accurate position of the subject sample is determined based on the subject sample region.

According to an exemplary embodiment of the present disclosure, in the step S330 in which the position of the subject sample is determined, center coordinates of the subject sample region are calculated, and the position of the subject sample is determined based on the center coordinates.

However, the present disclosure is not limited thereto, and the position of the subject sample may be determined by various calculation methods according to a shape of the subject sample. For example, in the case of a polygonal subject sample, the position of the subject sample may be determined based on coordinates corresponding to respective vertices of the subject sample.

As described above, according to the present disclosure, by identifying the sample position using the artificial neural network, a computational speed for identifying the sample position in the atomic force microscope can be increased, thereby improving identification performance of the atomic force microscope.

In particular, according to the present disclosure, the atomic force microscope can automatically identify and set a sample position without the need to separately set the position of the sample which is frequently used by the user to drive the atomic force microscope.

In addition, even if properties such as contrast, illuminance, and saturation of the vision image change or a part of the pattern of the sample changes, the sample position can be determined with high accuracy by the artificial neural network model based on pattern identification.

The method for identifying the sample position according to various exemplary embodiments of the present disclosure may be configured to operate as one or more software modules to perform operations, and vice versa.

Hereinafter, training and verification of a prediction model according to various exemplary embodiments of the present disclosure will be described with reference to FIGS. 6A to 6D.

FIGS. 6A to 6D show training data and evaluation results of a prediction model used to identify the position of the sample according to an exemplary embodiment of the present disclosure.

Figure 6A:
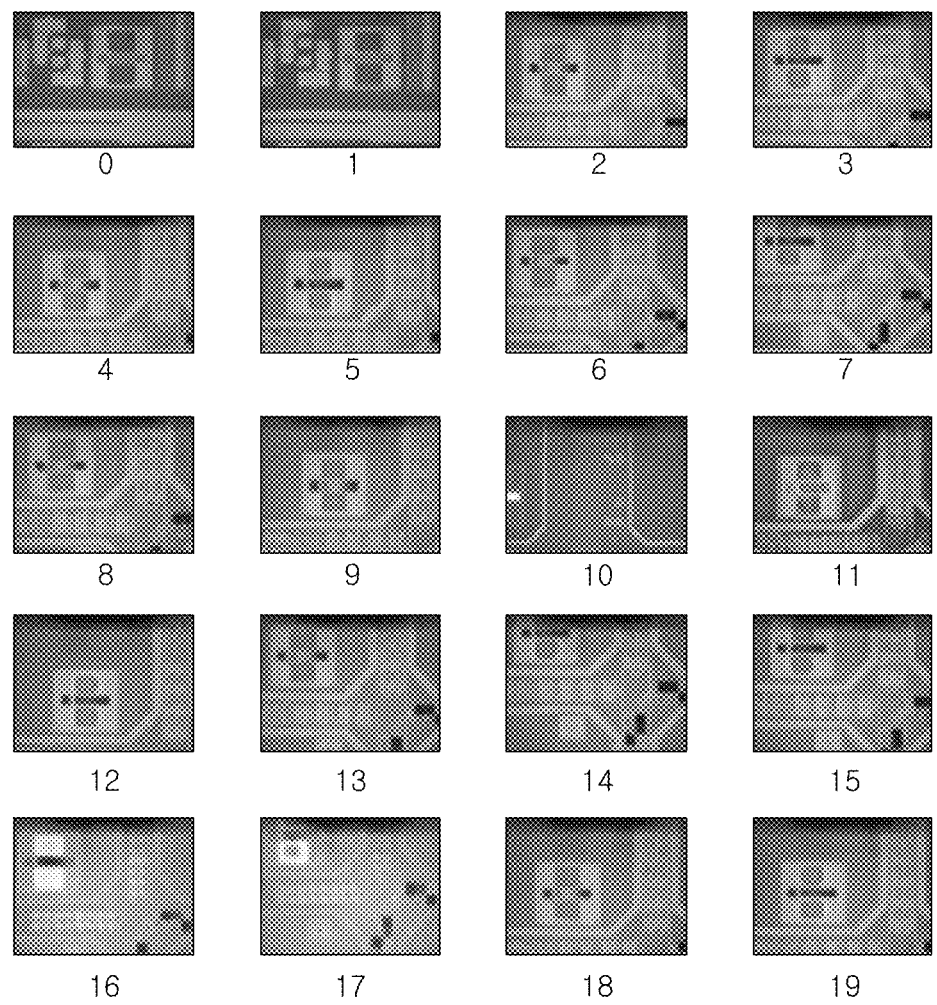
FIGS. 6A to 6D show training data and evaluation results of a prediction model used to identify a position of a sample according to an exemplary embodiment of the present disclosure.

First, referring to FIG. 6A, 100 sample pattern images were used for training and evaluation of the prediction model. In this case, in the respective sample pattern images, degrees of contrast, pattern states, and positions of samples may be different. Meanwhile, the sample used for training and evaluation of the prediction model may be a sample in which a device is patterned on a wafer, but is not limited thereto. For example, subject samples may include all samples that have various patterns and are subjects for position setting. Furthermore, the prediction model may be an artificial neural network model based on RetinaNet, an artificial neural network model based on Faster R-CNN, or an artificial neural network model based on Mask R-CNN, but is not limited thereto. For example, it may be on the basis of at least one algorithm selected from among a deep neural network (DNN) such as Resnet50, Resnet-v2, Resnet101, Inception-v3, or VGG net, R, DenseNet, and FCN with an encoder-decoder structure, SegNet, DeconvNet, DeepLAB V3+, or U-net, SqueezeNet, Alexnet, ResNet18, MobileNet-v2, and GoogLeNet.

Figure 6B:
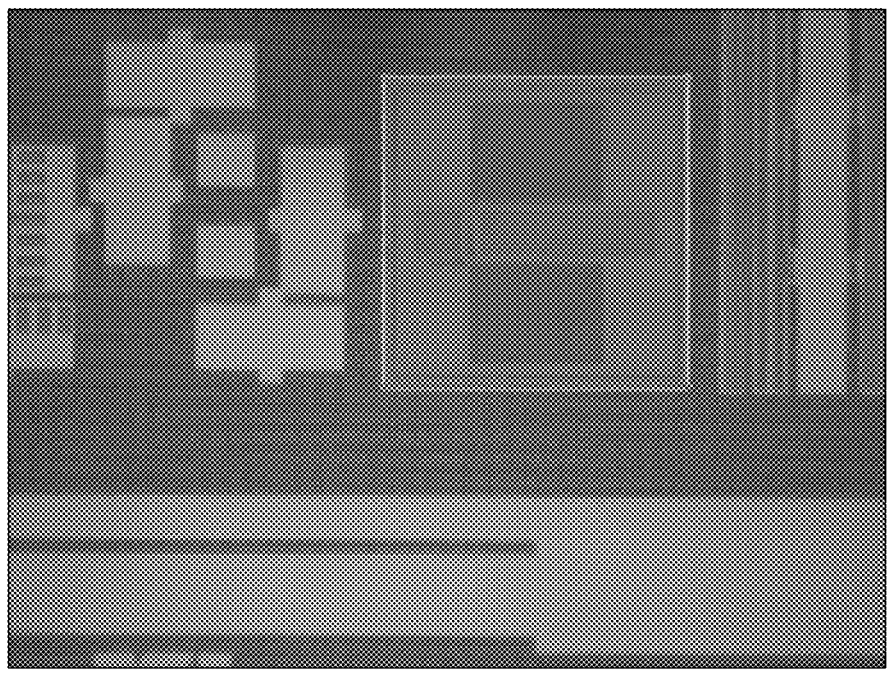

In this case, referring to FIG. 6B, an actual position of the pattern was labeled as a ground truth for training the prediction model.

Figure 6C:
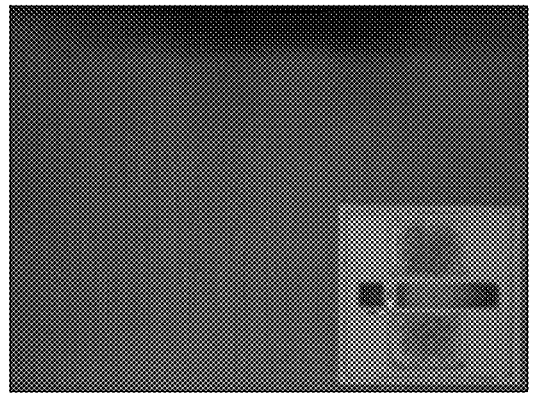
Figure 6C:
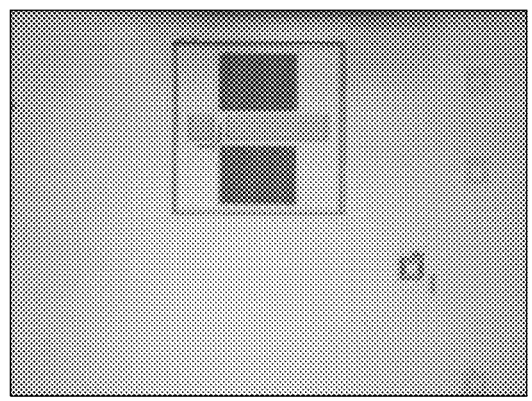
Figure 6C:
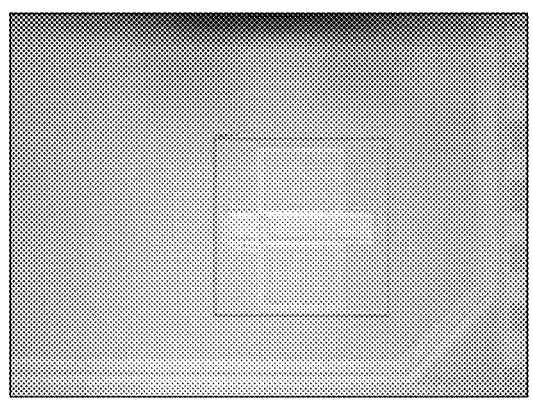
Figure 6D:
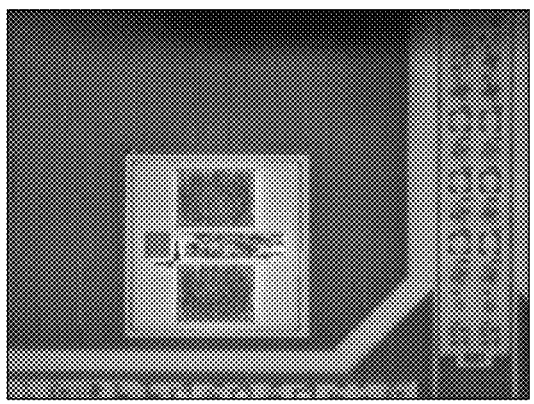
Figure 6D:
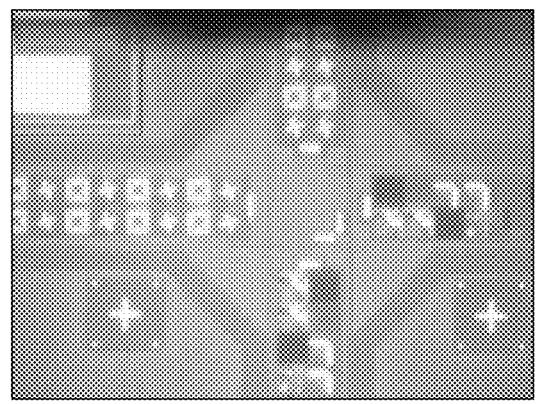
Figure 6D:
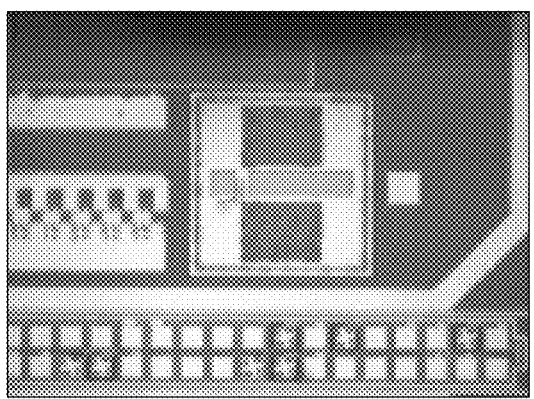
Figure 6D:
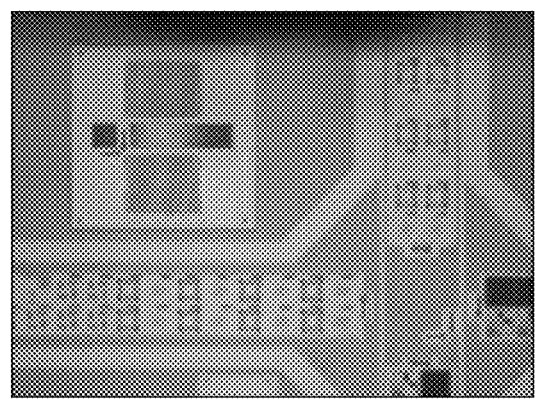

Referring to (a), (b) and (c) of FIG. 6C and (a), (b), (c) and (d) of FIG. 6D, it is shown that the prediction model accurately identifies the subject sample region even when the degree of contrast of the vision image is changed, the position of the sample is changed in the vision image or the state of the pattern is changed.

That is, according to the method for identifying the sample position based on the prediction model of the present disclosure, the subject sample region is predicted and its position is finally determined, so that the user can drive the atomic force microscope without setting the position of the subject sample.

Meanwhile, according to the method for identifying the sample position according to various exemplary embodiments of the present disclosure, calibration of the atomic force microscope may be performed automatically.

Figure 7:
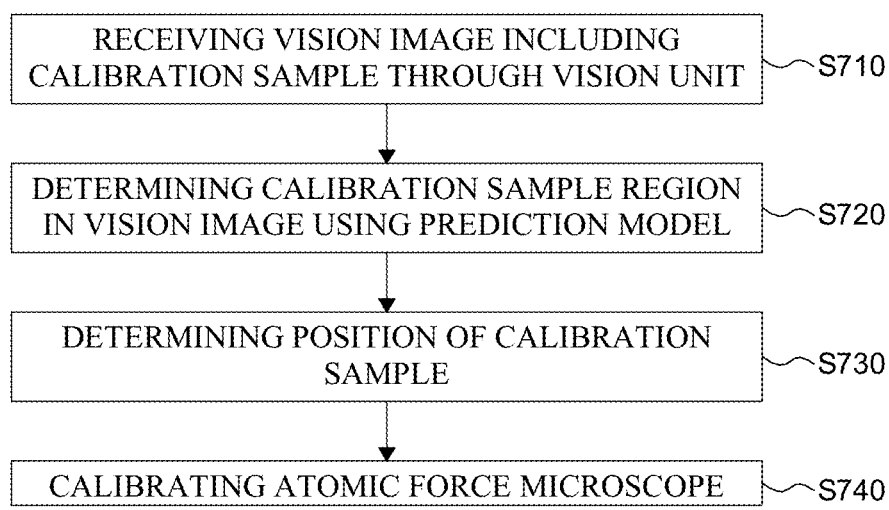
FIGS. 7 and 8 are exemplary diagrams for explaining a calibration procedure of an atomic force microscope using a method for identifying the position of the sample in the atomic force microscope according to an exemplary embodiment of the present disclosure.
Figure 8:
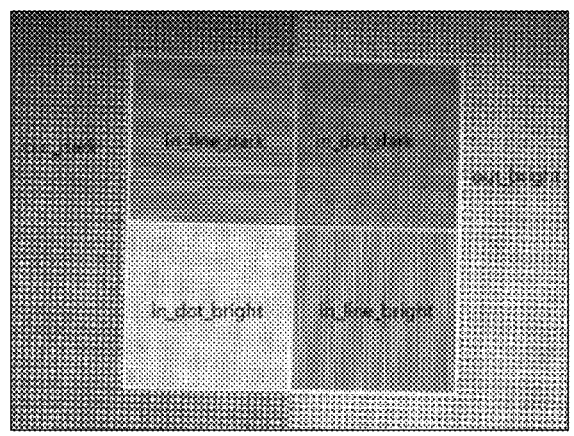
Figure 8:
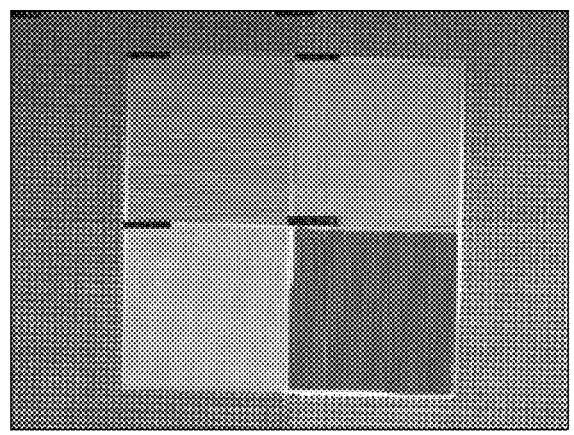

FIGS. 7 and 8 are exemplary diagrams for explaining a calibration procedure of an atomic force microscope using the method for identifying the sample position in the atomic force microscope according to an exemplary embodiment of the present disclosure.

First, referring to FIG. 7, to identify the sample position, a vision image including a calibration sample is received through the vision unit in step S710, a calibration sample region in the vision image is determined by the prediction model in step S720, and a position of the calibration sample is determined based on the calibration sample region in step S730. Next, the atomic force microscope is calibrated based on the position of the calibration sample in step S740.

According to an exemplary embodiment of the present disclosure, in step S710 in which the vision image for the calibration sample is received, the vision image for the calibration sample which is a subject having a pattern that is a set of figures or characters on a substrate, may be obtained.

For example, referring to (a) and (b) of FIG. 8, the calibration sample is disposed at a specific position (e.g., a specific region on a disk or wafer) and may be configured of a plurality of pattern regions in which brightness of a bright region or a darker region is different and a pattern shape of a linear shape or a dotted-shape is different. However, the calibration sample is not limited thereto and may be configured of a single pattern.

According to another exemplary embodiment of the present disclosure, in the step S710 in which the vision image is received, the on-axis camera image including the calibration sample which is obtained from the vision unit of the on-axis camera may be received, but is not limited thereto.

Referring back to FIG. 7, in the step S720 in which the calibration sample region is determined, the calibration sample region is determined by an artificial neural network-based prediction model configured to output the subject sample region by receiving the vision image as an input.

For example, in the step S720 in which the calibration sample region is determined, four pattern regions of the calibration sample shown in (a) and (b) of FIG. 8 may be determined, or one pattern region of the four pattern regions may be determined. This may be variously set according to the training data of the prediction model.

Next, in the step S730 in which the position of the calibration sample is determined, an accurate position of the calibration sample is determined based on the calibration sample region.

According to an exemplary embodiment of the present disclosure, in the step S730 in which the position of the calibration sample is determined, center coordinates of the calibration sample region determined by the prediction model are calculated, and the position of the calibration sample is determined based on the center coordinates.

However, the present disclosure is not limited thereto, and the position of the calibration sample may be determined by various calculation methods according to the shape of the calibration sample. For example, in the case of a polygonal calibration sample, the position of the calibration sample may be determined based on coordinates corresponding to respective vertices of the calibration sample.

Next, in the step S740 in which the atomic force microscope is calibrated, criteria of the Z scanner 122, the X-Y scanner 130, the X-Y stage 140, and the Z stage 150 of the atomic force microscope may be met, based on the position of the calibration sample, for example, based on a position of a calibration pattern selected by the user among a plurality of calibration sample patterns. Furthermore, in the step S740 in which the atomic force microscope is calibrated, more various calibrations may be performed to set criteria for analyzing properties of the subject sample.

That is, according to the method for identifying the sample position according to various exemplary embodiments of the present disclosure, even if a calibration sample is randomly disposed, a position of the sample is automatically determined, so that calibration on the atomic force microscope may be more easily performed.

Hereinafter, a method for measuring the sample position based on the identification factor will be described in detail with reference to FIGS. 9 and 10.

Figure 9:
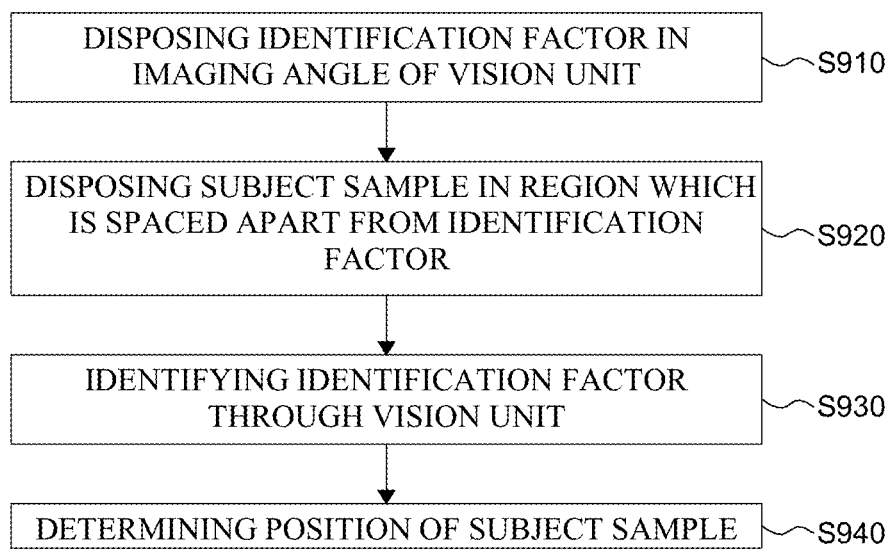
FIGS. 9 and 10 are exemplary diagrams for explaining a procedure of a method for identifying a position of a sample in an atomic force microscope according to another exemplary embodiment of the present disclosure.

First, referring to FIG. 9, to measure the position of the sample, the identification factor is disposed in an imaging angle of the vision unit in step S910, and a measurement sample is disposed in a region which is spaced apart from the identification factor in step S920. Then, the identification factor is identified by the vision unit in step S930, and a position of the measurement sample is finally determined in step S940.

More specifically, in the step S910 in which the identification factor is disposed, at least one identification factor of a QR code, a barcode, an NFC tag, an RFID tag, and an OCR code may be disposed on a disk or a sample holder. In this case, the identification factor is not limited to those described above, and may be a specific figure or character.

Next, in the step S920 in which the measurement sample is disposed, the subject sample may be disposed in a region adjacent to the identification factor.

Figure 10:
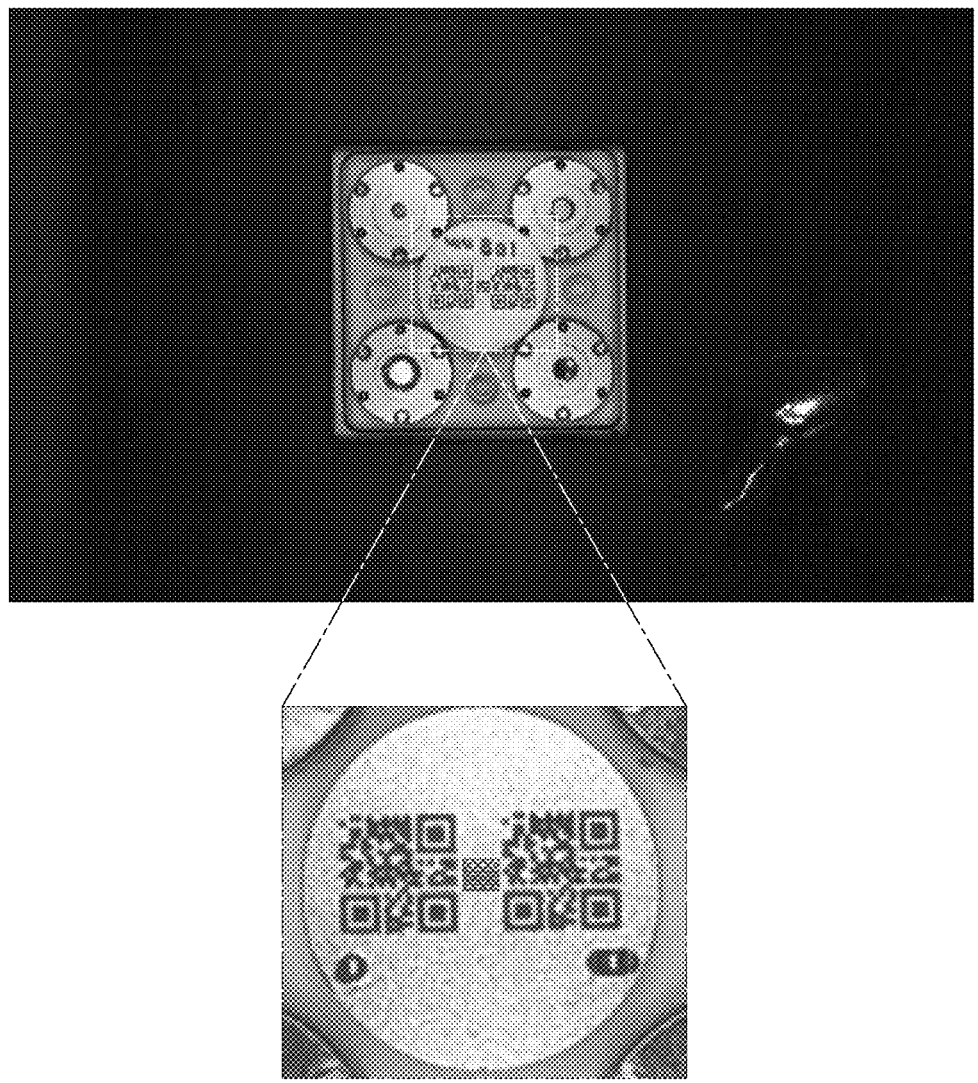

For example, referring to FIG. 10 together, a plurality of QR codes are disposed on a disk in step S910 in which the identification factor is disposed, and the subject sample may be disposed between the plurality of QR codes in step S920 in which the measurement sample is disposed.

In various exemplary embodiments of the present disclosure, after the step S910 in which the identification factor is disposed, the identification factor such as the QR code and the name of the subject sample may be mapped.

In this case, after the atomic force microscope is driven and a property analysis is performed on the sample, the position of the subject sample, a type of an applied probe, scan parameters, information on the vision image of the subject sample, and the like may be mapped to the identification factor.

That is, in the step S930 in which the identification factor is identified by the vision unit, when the identification factor which is previously disposed with respect to the subject sample previously measured is identified through the vision unit, information on the subject sample which is mapped through the identification factor may be shown.

Furthermore, in various exemplary embodiments of the present disclosure, after the step S940 in which the position of the measurement sample is determined, a position of the subject sample previously measured is determined and the atomic force microscope is driven to perform an additional analysis on the subject sample. Then, based on an analysis result, information on the subject sample may be updated in the identification factor.

Accordingly, according to the method for identifying the position of the subject sample based on the identification factor, the user may easily identify the position of the subject sample frequently used. Furthermore, the user can easily check information on the subject sample through the identification factor.

Although the exemplary embodiments of the present disclosure have been described in detail with reference to the accompanying drawings, it is to be understood that the present disclosure is not limited to those exemplary embodiments and various changes and modifications may be made without departing from the scope of the present disclosure. Therefore, the exemplary embodiments disclosed in the present disclosure are intended to illustrate rather than limit the scope of the present disclosure, and the scope of the technical idea of the present disclosure is not limited by these exemplary embodiments. Therefore, it should be understood that the above-described exemplary embodiments are illustrative in all aspects and not restrictive. The scope of the present disclosure should be construed according to the claims, and all technical ideas in the scope of equivalents should be construed as falling within the scope of the present disclosure.

What is claimed is:

1. A method for identifying a sample position performed by a controller of an atomic force microscope, the method comprising:
   receiving, through a vision unit, a vision image including a subject sample having a pattern which is a set of figures or characters on a substrate;
   determining a subject sample region in the vision image using a prediction model which is configured to output the subject sample region by receiving the vision image as an input and is trained to output a region of the subject sample by learning the pattern; and
   determining a position of the subject sample based on the subject sample region.

2. The method of claim 1, wherein the determining the subject sample region includes
   extracting a feature of the pattern using the prediction model, and
   determining the region of the subject sample based on the feature.

3. The method of claim 1,
   wherein the subject sample is a calibration sample for calibration of the atomic force microscope, and
   wherein the method further includes, after the determining the position of the subject sample, calibrating the atomic force microscope based on a position of the calibration sample.

4. The method of claim 1, wherein the determining the position includes
   calculating center coordinates of the subject sample region; and
   determining the position of the subject sample based on the center coordinates.

5. The method of claim 1,
   wherein the vision unit is an on-axis camera, and
   wherein the vision image is an on-axis camera image.

6. The method of claim 1, further comprising, before the receiving the vision image:
   disposing an identification factor in an imaging angle of the vision unit; and
   disposing the subject sample in a region which is spaced apart from the identification factor,
   wherein the receiving the vision image includes
       identifying the identification factor through the vision unit; and
       receiving the vision image for the subject sample based on the identification factor.

7. The method of claim 6, wherein the identification factor includes information on the subject sample.

8. The method of claim 6, wherein the identification factor is at least one of a QR code, a barcode, an NFC tag, an RFID tag, and an OCR code.

9. A method for identifying a sample position in an atomic force microscope, the method comprising:
   disposing an identification factor in an imaging angle of a vision unit;
   disposing a subject sample in a region which is spaced apart from the identification factor;
   identifying the identification factor through the vision unit;
   determining a position of the subject sample based on the identification factor; and
   mapping information of the subject sample to at least one of the position of the subject sample, a type of a predetermined probe, predetermined scan parameters and types of the subject sample, and the identification factor.

10. The method of claim 9, further comprising, after the determining the position:
  driving the atomic force microscope;
  performing an analysis on the subject sample; and
  updating the information of the subject sample based on an analysis result.

11. An apparatus for identifying a sample position in an atomic force microscope, the apparatus comprising:
  a vision unit which is configured to obtain a vision image including a subject sample having a pattern which is a set of figures or characters on a substrate, and
  a controller which is operatively connected to the vision unit,
  wherein the controller is configured to
    determine a subject sample region in the vision image, using a prediction model which is configured to output the subject sample region by receiving the vision image as an input and is trained to output a region of the subject sample by learning the pattern, and
    determine a position of the subject sample based on the subject sample region.

12. The apparatus of claim 11, wherein the controller is further configured to extract a feature of the pattern using the prediction model and determine a region of the subject sample based on the feature.

13. The apparatus of claim 11,
  wherein the subject sample is a calibration sample for calibration of the atomic force microscope, and
  wherein the controller is further configured to calibrate the atomic force microscope based on a position of the calibration sample.

14. The apparatus of claim 11, wherein the controller is further configured to
  calculate center coordinates of the subject sample region, and
  determine the position of the subject sample based on the center coordinates.

15. The apparatus of claim 11,
  wherein the vision unit is an on-axis camera, and
  wherein the vision image is an on-axis camera image.

16. The apparatus of claim 11, wherein the vision unit is further configured to
  identify an identification factor which is previously disposed in an imaging angle of the vision unit, and
  obtain the vision image of the subject sample which is previously disposed in a region spaced apart from the identification factor, based on the identification factor.

* * * * *